US008474804B2

(12) United States Patent
Masterson et al.

(10) Patent No.: US 8,474,804 B2
(45) Date of Patent: Jul. 2, 2013

(54) ELASTOMERIC PIN ISOLATOR

(75) Inventors: Peter A. Masterson, Carmel, IN (US); Timothy Samuel Farrow, Apex, NC (US)

(73) Assignee: Cabot Safety Intermediate LLC, Newark, DE (US)

( * ) Notice: Subject to any disclaimer, the term of this patent is extended or adjusted under 35 U.S.C. 154(b) by 1608 days.

(21) Appl. No.: 11/136,914

(22) Filed: May 25, 2005

(65) Prior Publication Data

US 2005/0206058 A1    Sep. 22, 2005

Related U.S. Application Data

(62) Division of application No. 10/334,548, filed on Dec. 31, 2002.

(60) Provisional application No. 60/434,290, filed on Dec. 17, 2002.

(51) Int. Cl.
*F16F 7/00* (2006.01)

(52) U.S. Cl.
USPC .................................... 267/141; 267/153

(58) Field of Classification Search
USPC ............ 267/136, 141, 141.4, 141.5, 153, 267/292, 293; 188/378, 379, 380; 720/692, 720/693, 694, 698, 651, 611; 248/635; 361/685; 369/263.1
See application file for complete search history.

(56) References Cited

U.S. PATENT DOCUMENTS

| 439,830 | A | | 11/1890 | Berbecker |
|---|---|---|---|---|
| 563,969 | A | | 7/1896 | Kempshall |
| 2,160,297 | A | | 5/1939 | Thompson ...................... 248/22 |
| 2,834,998 | A | | 5/1958 | Wilder |
| 3,053,046 | A | | 9/1962 | Fleming, Jr. ...................... 85/40 |
| 3,319,918 | A | | 5/1967 | Rapata ........................... 248/239 |
| 3,396,434 | A | * | 8/1968 | Overhoff ....................... 264/345 |
| 3,534,936 | A | | 10/1970 | Knowlton |
| 3,756,551 | A | | 9/1973 | Bishop |
| 4,067,531 | A | | 1/1978 | Sikula ......................... 248/358 R |
| 4,306,708 | A | | 12/1981 | Gassaway et al. |
| 4,579,473 | A | | 4/1986 | Brugger ......................... 403/163 |
| 4,681,497 | A | | 7/1987 | Berecz |
| 4,713,714 | A | * | 12/1987 | Gatti et al. ..................... 360/137 |
| 4,757,664 | A | | 7/1988 | Freissle .......................... 52/509 |

(Continued)

FOREIGN PATENT DOCUMENTS

| DE | 19818002 A1 | 10/1999 |
|---|---|---|
| EP | 0560642 A1 | 9/1993 |

(Continued)

OTHER PUBLICATIONS

English translation of Feneberg EP 1138961.*

*Primary Examiner* — Robert A Siconolfi
*Assistant Examiner* — Vu Q Nguyen

(57) ABSTRACT

An elastomeric pin isolator assembly is provided, including an elastomeric material, configured to engage a first support structure or mass, and a pin member, engaged with the elastomeric material, the pin member configured to slidably at least one of a second support structure or mass and the elastomeric material, and further wherein at least a portion of the elastomeric member is disposed between the first and second support structures or masses such that the first and second support structures or masses do not directly contact.

4 Claims, 5 Drawing Sheets

U.S. PATENT DOCUMENTS

| | | | |
|---|---|---|---|
| 5,761,033 A * | 6/1998 | Wilhelm | 361/686 |
| 6,138,980 A | 10/2000 | Farbotnik | 248/638 |
| 6,238,026 B1 * | 5/2001 | Adams et al. | 312/223.2 |
| 6,324,731 B1 | 12/2001 | Pliml, Jr. | 24/453 |
| 6,328,293 B1 | 12/2001 | Olsen | 267/140.11 |
| 6,378,832 B1 | 4/2002 | Li et al. | 248/637 |
| 6,435,793 B1 | 8/2002 | Dobson | |
| 6,676,351 B1 | 1/2004 | Bruns | |
| 2002/0051338 A1* | 5/2002 | Jiang et al. | 361/685 |
| 2002/0176350 A1 | 11/2002 | Kadowaki et al. | 369/263 |
| 2003/0095377 A1* | 5/2003 | Goodman et al. | 361/685 |
| 2004/0113339 A1 | 6/2004 | Masterson et al. | 267/153 |
| 2004/0194121 A1 | 9/2004 | Liao et al. | |

FOREIGN PATENT DOCUMENTS

| | | |
|---|---|---|
| EP | 1138961 * | 10/2001 |
| EP | 1138961 B1 | 10/2001 |
| EP | 1262987 | 12/2002 |
| EP | 1453181 | 9/2004 |
| JP | 63-095928 | 6/1988 |
| WO | WO 2004/061326 A1 | 7/2004 |

* cited by examiner

ELASTOMERIC PIN ISOLATOR

REFERENCE TO RELATED PATENT APPLICATIONS

The present application is a divisional of Application No. 10/334548, filed 31 Dec. 2002, which claims the benefit of U.S. Provisional Application No. 60/434290, filed 17 Dec. 2002 the entire disclosures of which are specifically incorporated by reference herein.

BACKGROUND

The present disclosure describes an elastomeric pin isolator used as a shock and vibration isolation device.

Elastomer isolators may generally be used to provide shock and vibration isolation between a mass and its surrounding structure. Characteristics of the elastomer material and the isolator structure may be varied to tailor attenuation values. In the case of consumer electronics, a high damped elastomer may be used to provide additional attenuation of transient loads and resonances. Additionally, ribs may be used on outer or internal surfaces to allow for greater displacement capability and lower stiffness.

Reference is made to PRIOR ART FIG. 1, which illustrates conventional elastomeric grommets 10 secured by threaded fasteners 12. Exemplary fixturing of such grommets is illustrated by PRIOR ART FIGS. 2-4. Conventional grommets 10 are inserted into sheet metal or other thin, rigid material 20, e.g., a frame of a computer, and connected to an isolated mass 16, e.g., a computer hard drive, by a threaded fastener 12. Such grommets 10 must be loaded by the head 18 of the threaded fastener 12 or by a washer (not shown) on one side and by the isolated mass 16 on the other side. With reference to Prior Art FIGS. 3 and 4, the orientation can also be reversed, such that the thin, rigid material 20 is isolated from a surrounding structure 14. Nuts 22 and/or washers 24 may be required to secure the fastener 12.

Installation of conventional elastomeric isolators is generally cumbersome on a large scale, particularly where such installation requires tools, such as screwdrivers or socket wrenches, and hardware, including washers and nuts. There is a demand for quality isolation products that are easier and faster to install.

SUMMARY

The presently described elastomeric pin isolator assembly overcomes and alleviates the above and other problems and disadvantages of the prior art. The present elastomeric pin isolator includes an elastomeric material, configured to engage a first support structure or mass, and a pin member, engaged with the elastomeric material, the pin member configured to slidably engage at least one of a second support structure or mass and the elastomeric material, and further wherein at least a portion of the elastomeric member is disposed between the first and second support structures or masses such that the first and second support structures or masses do not directly contact.

The above discussed and other features and advantages of the elastomeric pin isolator will be appreciated and understood by those skilled in the art from the following detailed description and drawings.

BRIEF DESCRIPTION OF THE DRAWINGS

Referring now to the drawings, wherein like elements are numbered alike in the several FIGURES.

PRIOR ART

PRIOR ART

DETAILED DESCRIPTION OF EXEMPLARY EMBODIMENTS

Reference will now be made in detail to exemplary embodiments, examples of which are illustrated in the accompanying drawings.

Figure 1:
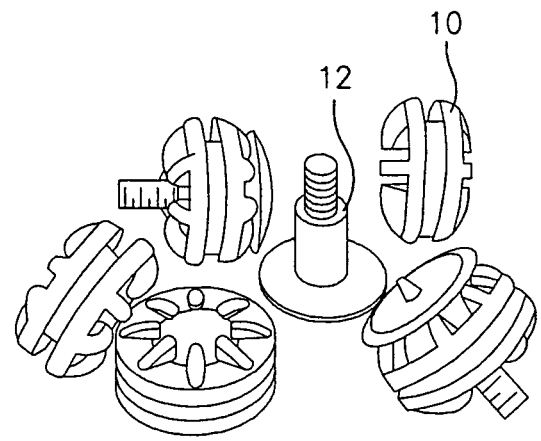
FIG. 1 illustrates conventional grommets with threaded fasteners.
Figure 2:
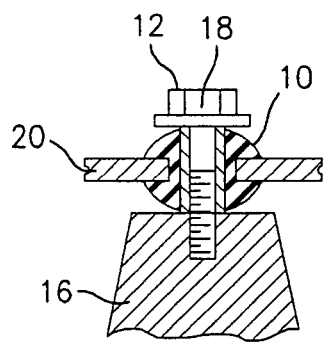
FIGS. 2-4 illustrate conventional fixturing of grommets with threaded fasteners.
Figure 3:
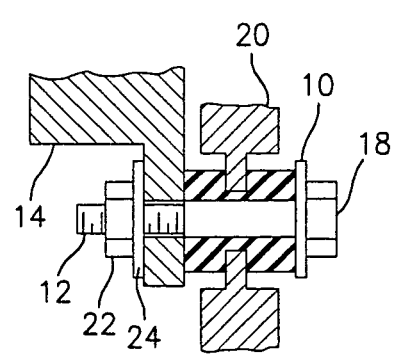
Figure 4:
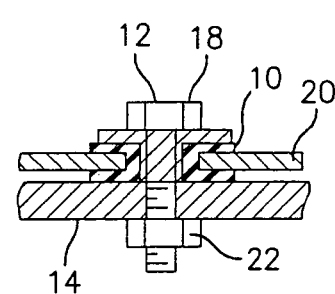
Figure 5:
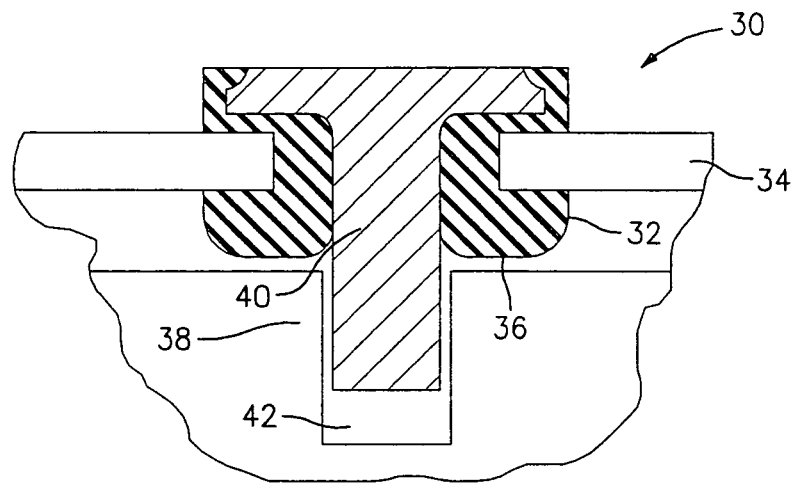
FIG. 5 illustrates a side elevation view of an exemplary elastomeric pin isolator inserted in sheet metal and loaded on a top side.

Referring now to FIG. 5, the presently described elastomeric pin isolator, shown generally at 30, is illustrated in an installed position, wherein elastomeric material 32 of the elastomeric pin isolator 30 is inserted within a rigid structure 34 and loaded on a top side 36 of the elastomeric material 32 with an isolated mass 38. The pin member 40 of the elastomeric pin isolator 30 is shown in place between the elastomeric material 32 and the isolated mass 38 and inserted within an aperture 42 of the isolated mass 38.

With reference to FIGS. 6-9, the presently described elastomeric pin isolator 30 is illustrated in greater detail. The elastomeric pin isolator 30 includes an elastomeric material 32 configured to engage a first support structure 34. The illustrated elastomeric material 32 includes a circumferential groove 44 configured to engage the edges (not shown) of a support structure (see 34 in FIG. 5). However, any means of engaging the elastomeric material 32 with the support structure 34 when in an installed position is contemplated, including without limitation, various interference fit configurations or slot and pin configurations. Indeed, where such elastomeric pin isolators 30 are used in pairs across an isolated mass (see 38 in FIG. 5), and wherein the elastomeric materials 32 of such elastomeric pin isolators 30 are loaded by the isolated mass 38, a circumferential groove 44 is not required. Rather, the elastomeric pin isolator 30 need only be secured against slipping across the surface of the support structure 34 facing the isolated mass 38. A pin and slot configuration, wherein at least one projection on either the support structure 34 or the elastomeric material 32 engages at least one slot on either the elastomeric material 32 or the support structure 34, would suffice. Other equivalent means for securing the position of the elastomeric pin isolator 30 against slippage are contemplated. Additionally, the elastomeric material 32 may be bonded with or co-molded to the support structure 34.

Referring still to FIGS. 5-9, the exemplary elastomeric pin isolator 30 also includes a pin member 40 engaged with the elastomeric material 32. The pin member 40 is configured to slidably engage at least one of a second support structure or mass (e.g., an isolated mass 38) and the elastomeric material 32. Where such pin member 40 is configured to slidably engage the second support structure or mass, the pin member 40 should include a cross sectional diameter less than that of a corresponding aperture (e.g., aperture 42 in FIG. 5) on the second support structure or mass. Where such pin member 40 is configured to slidably engage the elastomeric member 32, the pin member should have a cross sectional diameter less a stretched diameter of an aperture 46 in the elastomeric member 32. Additionally, where such pin member 40 is configured to slidably engage the elastomeric member 32, either the aperture 46 in the elastomeric member 32 should comprise a closed channel (not shown), the closed portion of the channel preventing the pin member 40 from falling out of the elastomeric member 32, or the pin member 40 should include a threaded portion, the threaded portion engaging a corresponding threaded aperture on the second support structure or mass (e.g., the isolated mass 38 in FIG. 5).

Figure 6:
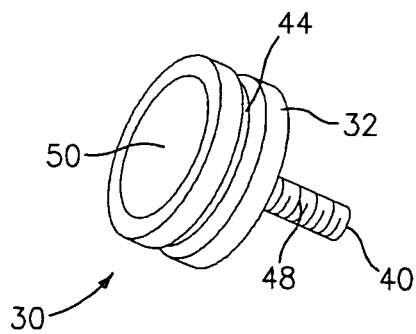
FIG. 6 illustrates a front elevation view of an exemplary elastomeric pin isolator in accordance with the present disclosure.
Figure 7:
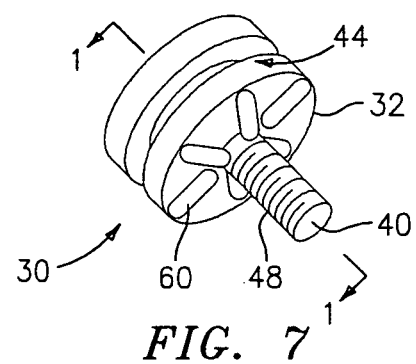
FIG. 7 illustrates a rear elevation view of the exemplary elastomeric pin isolator of FIG. 5.
Figure 8:
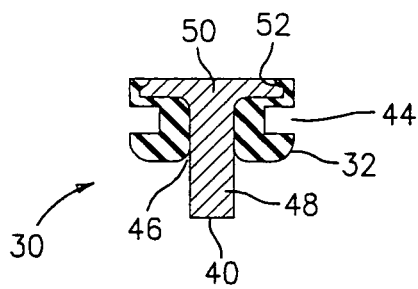
FIG. 8 illustrates a cross-sectional side view of the exemplary elastomeric pin isolator of FIG. 7 taken along section 1-1.
Figure 9:
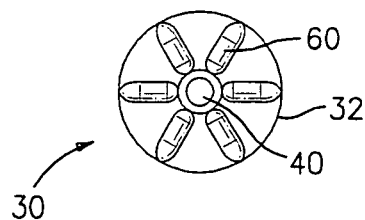
FIG. 9 illustrates a top plan view of an exemplary elastomeric pin isolator in accordance with the present disclosure.

With reference again to FIGS. 5-9, the pin member 40 may be fixedly engaged with the elastomeric member 32. In one exemplary embodiment, as illustrated, the pin member may comprise a pin shaft 48 and a pin head 50. With reference to FIGS. 6 and 8, the pin head 50 is secured or captured by the elastomeric material 32, such that the pin member 40 will not disengage from the elastomeric material 32 when disassembly is not desired. In such case, the elastomeric member 32 may be installed in place, the second support structure or mass may be positioned, and the pin shaft 48 may be inserted through apertures 52 and 46 in the elastomeric member 32 and into the second support structure or mass. Installation is completed by fixedly engaging the pin head 50 with the elastomeric material 32.

However, the present disclosure contemplates equivalent configurations, e.g., where the pin member 40 is pre-assembled with the elastomeric member 32 or where the pin member 40 does not include a pin head 50, and wherein the pin member 40 is fixedly secured (i.e., not in slidably engaged with) within the elastomeric material 32, e.g., by a mechanical interference fit or by chemical bonding. In one embodiment, the pin member 40 is insert molded into the elastomeric material 32.

The positioning of the first support structure or mass surrounding an isolated mass and/or the thickness of elastomeric material 32 between the first support structure or mass and the isolated mass may be varied to set any desired pre-load upon the elastomeric members 32 of the elastomeric pin isolators 30 surrounding the isolated mass in an assembled state.

For example, in one embodiment, the positioning of the first support structure or mass is adjusted relative to the size of the isolated mass and the thickness of the elastomeric member 32, which includes axial ribs 60, is adjusted such that the elastomeric members 32 of each elastomeric pin isolator 30 achieves a pre-loading of about 5 to 10 percent the height of the ribs 60 on the elastomeric member 32. In such embodiment, the state of compression on the ribs 60 resultant from the pre-load provides a source of stiffness to the isolation.

Only a relatively large magnitude shock will unload the ribs on one side of the isolated mass. However, even though the ribs are unloaded on one side, the isolated mass does not leave indirect contact with the unloaded elastomeric members because of the sliding nature of the pin member, described above. While a specific pre-load and a specific elastomeric member configuration has been specified by way of example, it should be recognized that both the pre-load and the configuration of the elastomeric member may take equivalent values and conformations or may be adjusted to suit any number of given applications.

Figure 10:
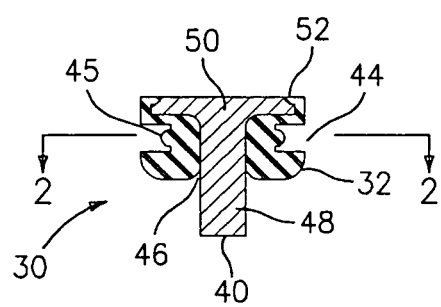
FIG. 10 illustrates a cross-sectional view of an exemplary elastomeric pin isolator including radial ribs.
Figure 11:
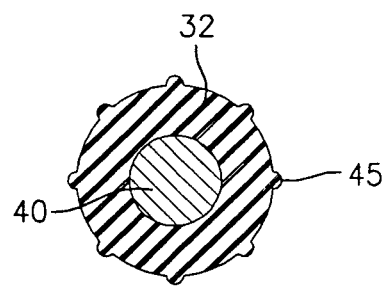
FIG. 11 illustrates a cross-sectional view of the exemplary elastomeric pin isolator of FIG. 10 taken along section 2-2.
Figure 12:
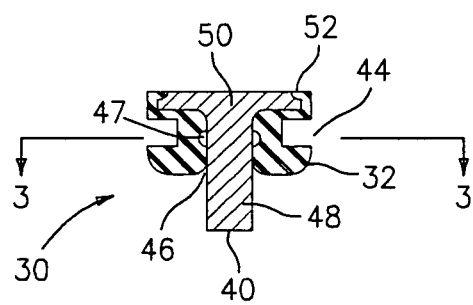
FIG. 12 illustrates a cross-sectional view of an exemplary elastomeric pin isolator including radial voids.
Figure 13:
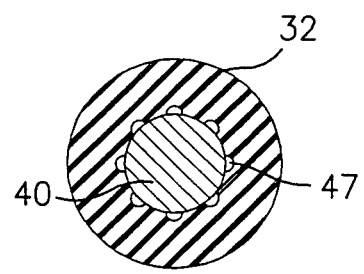
FIG. 13 illustrates a cross-sectional view of the exemplary elastomeric pin isolator of FIG. 12 taken along section 3-3.

Additionally, ribs (see axial ribs 60 in FIG. 7) may be provided on the load surface of the elastomeric member 32 to adjust axial stiffness of the isolator. Further, with reference to FIGS. 10 and 11, ribs 45 may optionally be placed in the outer diameter of the cylindrical segment in groove 44 to adjust radial stiffness of the isolator. Also, with reference to FIGS. 12 and 13, cores or voids 47 around the pin 40 may optionally be included in the elastomeric member 32 to adjust radial stiffness of the isolator.

The elastomeric material has herein been described as generally comprising an elastomer. Without limiting the scope, the elastomeric material may also be a moldable thermoplastic or thermoset elastomer, e.g., TPE, urethane or natural rubber. The elastomer may or may not have high damping characteristics.

The pin material may be any relatively rigid material. Without limitation, steel, aluminum and high strength plastic, e.g., acetal or nylon, are excellent materials. Also, where a grounding path is desired between the isolated mass and the surrounding structure or chassis, the pin may be selected from any number of electrically conductive materials, e.g., metallic compositions such as steel. In such case it may be desired to provide an exposed portion of the pin member or a conductive attachment to the pin member for grounding to the surrounding structure or chassis.

Figure 14:
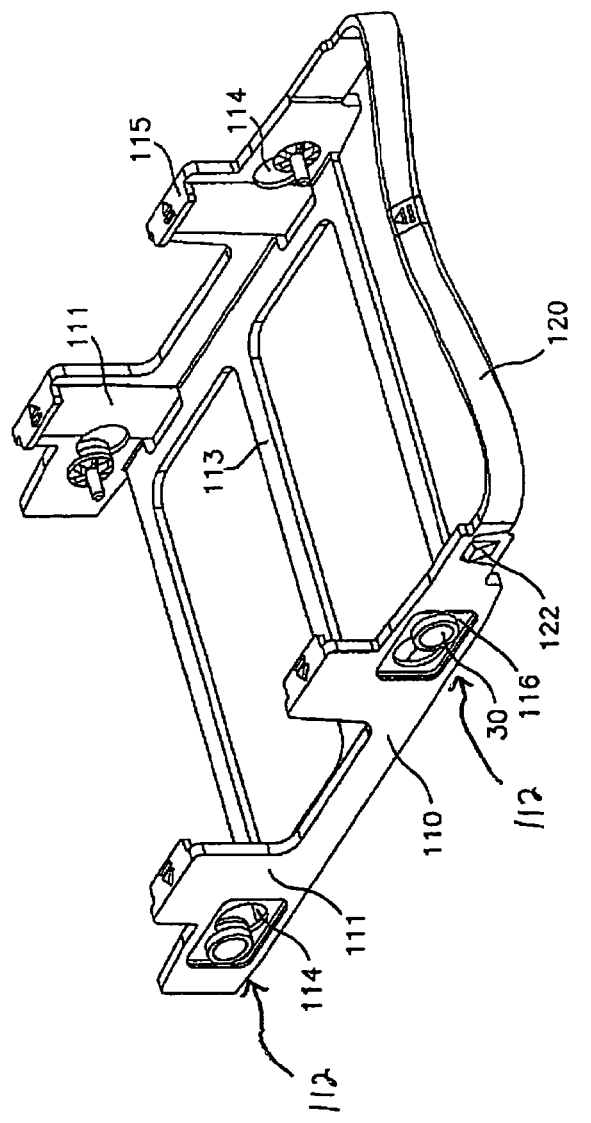
FIG. 14 illustrates an exemplary tray application incorporating presently described elastomeric pin isolators.

Referring now to FIG. 14, an exemplary application utilizing a plurality of elastomeric pin isolators 30 is illustrated as a tray mechanism, shown generally at 110. In the illustrated embodiment, the tray mechanism 110 utilizes two pairs of such isolators 30, each pair generally placed in opposing configurations within the material of the tray 110. The exemplary tray 110 also includes a plurality of side walls 111, a plurality of rails 113 connecting such side walls 111 and top surface tabs 115 deflectable to permit installation of an isolated mass (100 in FIG. 15).

The illustrated exemplary tray 110 also includes certain additional features, such as installation apertures 112. Each aperture is provided with an insertion position (or insertion aperture) 114 as well as an installation position (or installation aperture) 116. The insertion position 114 is generally configured with a diameter greater that that of the installation position 116, and is configured to permit the isolators 30 to be inserted at least partially through the material of the tray 110. The installation position 116 is adjacent to the insertion position 114 and is configured such that movement of the isolator 30 from the insertion position 114 to the installation position 116 effects positive engagement of the isolator circumferential groove 44 with the wall material of the tray mechanism 110.

With further reference to FIG. 14, an additional feature of the tray mechanism 110 is illustrated, including a handle 120 and an engagement clip 122. Such handle and engagement clip features facilitate removable installation of the tray 110 and isolated mass (100 in FIG. 15) in such cases where the tray 110, including side walls 111, rails 113 and top surface tabs 115, is configured to slidably engage another structure, e.g., the bay of a computer.

Figure 15:
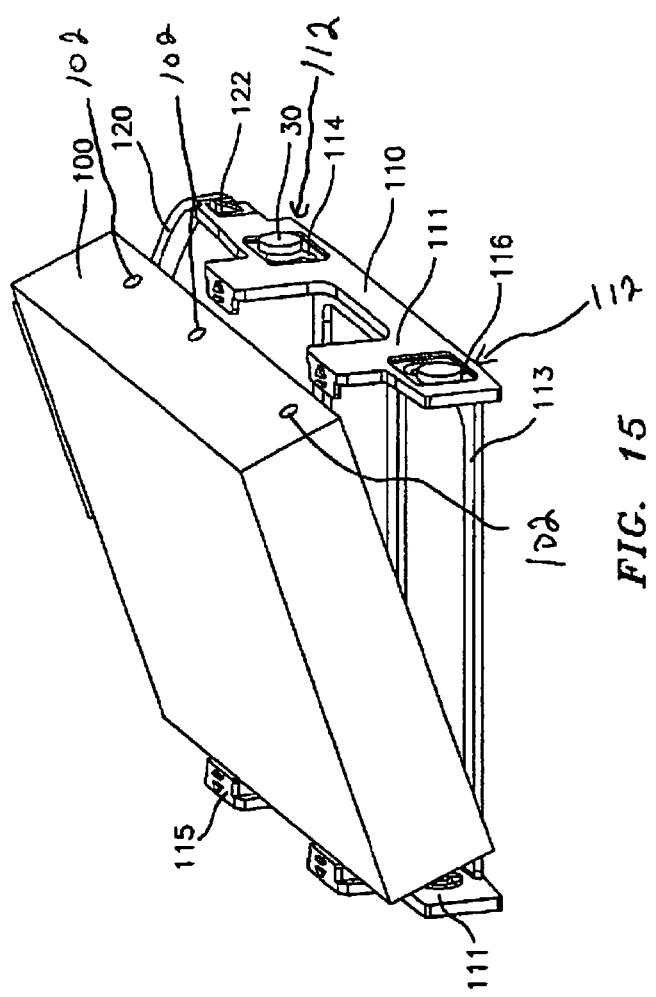
FIG. 15 illustrates an exemplary tray application with an isolated mass.

Referring now to FIG. 15, an exemplary isolated mass 100 is shown partially installed within the exemplary tray mechanism 110 of FIG. 14. The isolated mass 100 includes a plurality of apertures 102 configured to slidably engage the pins of the plurality of elastomeric pin isolators 30. In one embodiment, the tabs 115 are deflectable to permit the isolated mass 100 to be in alignment for complete installation. In another embodiment, the tabs 115 are deflectable to permit the isolated mass 100 to clear the tabs 115 as well as the pin members 40 of the installed elastomeric pin isolators 30. In such embodiment, when the pin members 40 are properly aligned with the apertures 102 in the isolated mass 100, the deflectable tabs are permitted to return to their original position to complete the installation of the isolated mass 100 within the tray mechanism 110.

The presently described elastomeric pin isolator not only advantageously provides a quick and easily installed isolation mechanism, but also provides a space reducing solution relative to prior art elastomeric isolators and fasteners. Such space reduction finds particular advantage in consumer electronics, e.g., as in the computer hard drive isolation exemplified by the embodiments of FIGS. 14 and 15, where space is critical.

It will be apparent to those skilled in the art that, while exemplary embodiments have been shown and described, various modifications and variations can be made to the elastomeric pin isolator and/or applications utilizing one or more elastomeric pin isolators disclosed herein without departing from the spirit or scope of the invention. Accordingly, it is to be understood that the various embodiments have been described by way of illustration and not limitation.

What is claimed is:

1. An assembly comprising:
   a frame, said frame comprising at least two opposing frame walls connected by at least one frame rail; and
   at least one elastomeric pin isolator provided in engagement with one of said at least two opposing frame walls; and
   at least one elastomeric pin isolator provided in engagement with another of said at least two opposing frame walls;
   wherein at least one of said elastomeric pin isolators comprises: an elastomeric material configured to securely engage at least one of said at least two opposing frame walls and a pin member securely engaged with the elastomeric material, the pin member configured to slidably engage a second support structure or mass, and further wherein at least a portion of the elastomeric member is disposed between the at least one of said at least two opposing frame walls and said second support structure or mass such that at least one of said at least two opposing frame walls and the second support structure or mass do not directly contact, and
   wherein the assembly includes top and bottom surfaces, wherein a deflectable tab comprises at least part of at least one of the top and bottom surfaces.

2. An assembly, comprising:
   a frame, said frame comprising at least two opposing frame walls connected by at least one frame rail; and
   at least one elastomeric pin isolator provided in engagement with one of said at least two opposing frame walls; and
   at least one elastomeric pin isolator provided in engagement with another of said at least two opposing frame walls;
   wherein at least one of said elastomeric pin isolators comprises: an elastomeric material configured to securely engage at least one of said at least two opposing frame walls and a pin member securely engaged with the elastomeric material, the pin member configured to slidably engage a second support structure or mass, and further wherein at least a portion of the elastomeric member is disposed between the at least one of said at least two opposing frame walls and said second support structure or mass such that at least one of said at least two opposing frame walls and the second support structure or mass do not directly contact,
   wherein one of said at least two opposing frame walls is deflectable.

3. The assembly in accordance with claim 2, wherein at least one of said at least two opposing frame walls is deflectable, and wherein said pin member of said at least one elastomeric pin isolator is deflectable therewith.

4. The assembly in accordance with claim 3, wherein said pin member and said at least one of said at least two opposing frame walls is deflectable to remove said pin member engaged with said at least one of said at least two opposing frame walls from an installation path of said second support structure or mass.

\* \* \* \* \*

UNITED STATES PATENT AND TRADEMARK OFFICE
CERTIFICATE OF CORRECTION

| | | |
|---|---|---|
| PATENT NO. | : 8,474,804 B2 | Page 1 of 1 |
| APPLICATION NO. | : 11/136914 | |
| DATED | : July 2, 2013 | |
| INVENTOR(S) | : Peter A. Masterson et al. | |

It is certified that error appears in the above-identified patent and that said Letters Patent is hereby corrected as shown below:

<u>Title page, Column 2, Abstract (57),</u>
Line 4, after the word "slidably" insert the word --engage-- therefor.

In the Specification

<u>Column 4,</u>
Line 56, delete "1 10." and insert --110.-- therefor.

Signed and Sealed this
Nineteenth Day of November, 2013

Teresa Stanek Rea
*Deputy Director of the United States Patent and Trademark Office*